(12) United States Patent
Bernal

(10) Patent No.: US 12,400,561 B2
(45) Date of Patent: Aug. 26, 2025

(54) SUSPENDING THE EYE IN A MODEL FOR SURGICAL SIMULATION

(71) Applicant: Bioniko Consulting, LLC, Sunny Isles, FL (US)

(72) Inventor: Andres Bernal, Sunny Isles, FL (US)

(73) Assignee: Bioniko Consulting LLC, Sunny Isles, FL (US)

( * ) Notice: Subject to any disclaimer, the term of this patent is extended or adjusted under 35 U.S.C. 154(b) by 721 days.

(21) Appl. No.: 17/858,216

(22) Filed: Jul. 6, 2022

(65) Prior Publication Data

US 2024/0013681 A1 Jan. 11, 2024

(51) Int. Cl.
  *G09B 23/30* (2006.01)
  *G09B 23/32* (2006.01)
  *G09B 23/34* (2006.01)

(52) U.S. Cl.
  CPC .............. *G09B 23/34* (2013.01); *G09B 23/32* (2013.01)

(58) Field of Classification Search
  CPC ........ G09B 23/28; G09B 23/30; G09B 23/32; G09B 23/34
  USPC ........................................................ 434/271
  See application file for complete search history.

(56) References Cited

U.S. PATENT DOCUMENTS

| | | |
|---|---|---|
| 1,868,209 A | 7/1932 | Kapernick |
| 2,792,573 A | 5/1957 | Clarke |
| 4,596,528 A | 6/1986 | Lewis |
| 5,090,910 A | 2/1992 | Narlo |
| 5,221,208 A | 6/1993 | Alexander |
| 5,893,719 A | 4/1999 | Radow |
| 6,485,142 B1 | 11/2002 | Sheehy et al. |
| 7,066,598 B2 * | 6/2006 | Niven ................. G09B 23/30 351/203 |
| 7,291,016 B2 | 11/2007 | Otto |
| 7,896,653 B2 | 3/2011 | Nylen |
| 8,684,743 B2 | 4/2014 | Van Dalen |
| 8,715,033 B2 * | 5/2014 | Smoot ................. A61F 2/141 446/131 |
| 8,845,334 B1 * | 9/2014 | Stoll ................. G09B 23/28 434/270 |
| 9,336,692 B1 | 5/2016 | Stoll |
| 9,437,119 B1 | 9/2016 | Bernal |

(Continued)

FOREIGN PATENT DOCUMENTS

| | | |
|---|---|---|
| CN | 112842255 A | 5/2021 |
| WO | 2024/010623 | 1/2024 |
| WO | 2024/010623 A1 | 1/2024 |

OTHER PUBLICATIONS

International Search Report and Written Opinion for PCT/US23/18748, dated Jul. 28, 2023.

(Continued)

*Primary Examiner* — Kurt Fernstrom
(74) *Attorney, Agent, or Firm* — Fleit Intellectual Property Law; Gary S. Winer; Paul D. Bianco

(57) ABSTRACT

An eye model for simulating surgery has an eyeball portion suspended within a frame. The suspension has a flexible material connected to the eyeball and the frame which flexes when the eyeball is pushed during a surgical simulation, so that the eyeball can be moved within a range of motion corresponding to the range of motion of the natural eye, and also so that when the force is applied to the eyeball the eyeball resists displacement with a force similar to resistance of the natural eye.

20 Claims, 3 Drawing Sheets

(56) References Cited

U.S. PATENT DOCUMENTS

| | | | |
|---|---|---|---|
| 9,504,925 B2 * | 11/2016 | Laurer | |
| 10,360,815 B2 * | 7/2019 | Bernal | A61F 9/00736 |
| 10,410,543 B2 | 9/2019 | Gada | |
| 10,636,325 B2 | 4/2020 | Bernal | |
| 11,127,314 B2 | 9/2021 | Bernal | |
| 11,710,425 B2 * | 7/2023 | Segall | G09B 23/32 434/271 |
| 11,741,855 B2 * | 8/2023 | Omata | G09B 23/32 434/271 |
| 2009/0111081 A1 | 4/2009 | Nylen | |
| 2009/0291423 A1 | 11/2009 | Hara | |
| 2014/0038153 A1 | 2/2014 | Courtoy | |
| 2014/0170623 A1 * | 6/2014 | Jarstad | G09B 23/30 434/267 |
| 2014/0356836 A1 | 12/2014 | Van Dalen | |
| 2015/0024364 A1 | 1/2015 | Lee | |
| 2016/0063898 A1 | 3/2016 | Bernal | |
| 2016/0098944 A1 * | 4/2016 | Lin | G09B 23/32 434/271 |
| 2016/0372011 A1 | 12/2016 | Bernal | |
| 2017/0229043 A1 | 8/2017 | Huh | |
| 2018/0122268 A1 | 5/2018 | Segall | |
| 2018/0290063 A1 | 10/2018 | Wang | |
| 2019/0051216 A1 | 2/2019 | Bernal | |
| 2019/0318661 A1 | 10/2019 | Bernal | |
| 2020/0118466 A1 | 4/2020 | Bernal | |
| 2020/0372833 A1 | 11/2020 | Bernal | |
| 2024/0013681 A1 | 1/2024 | Bernal | |

OTHER PUBLICATIONS

Written Opinion and International Search Report for PCT/US23/18748 filed Jul. 6, 2022.

Eyecre.at—Web-site http://eyecre.atGmbH—Head 4 Eyes, practice head model product description, p. 1; retrieved May 21, 2019.

GuldenOphthalmics—Web-site http://IdreesEyeSurgeryPracticeHead_GuldenOphthalmics—Idrees Eyes Surgery Practice Head product description; p. 1; retrieved May 21, 2019.

Phillips Eye Studio—Ophthalmic Simulated Surgery—PS018 OSILA Anatomical Head; p. 1—retrieved May 21, 2019.

Web-site http://retina2020.com/detached-retina-sugery-inland-empire/—"Detached Retina Surgery Inland Empire", Retina Institute, retrieved Jul. 18, 2017.

Web-site https://fci-ophthalmics.com/products/cataract-1274/kitaro-kits—Kitaro Kits; FCI Ophthalmics—Copyright 2018—retrieved Oct. 30, 2018.

Web-site http://www.phillipsstudio.co.uk/products.htm—Ophthalmic Simulated Surgery; Phillips Studio Eye—Copyright 1995-2017—retrieved Oct. 30, 2018.

* cited by examiner

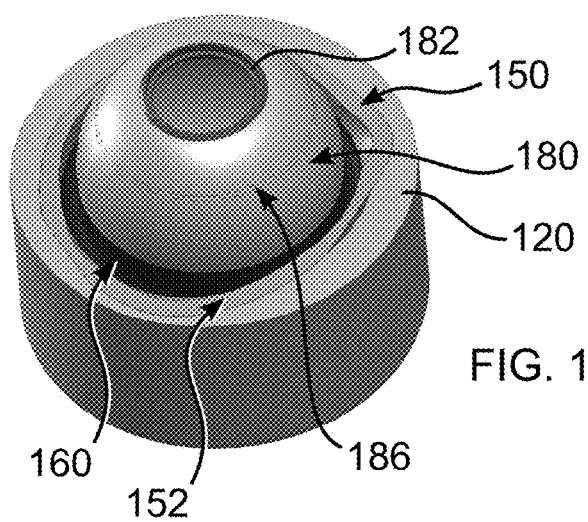
FIG. 1
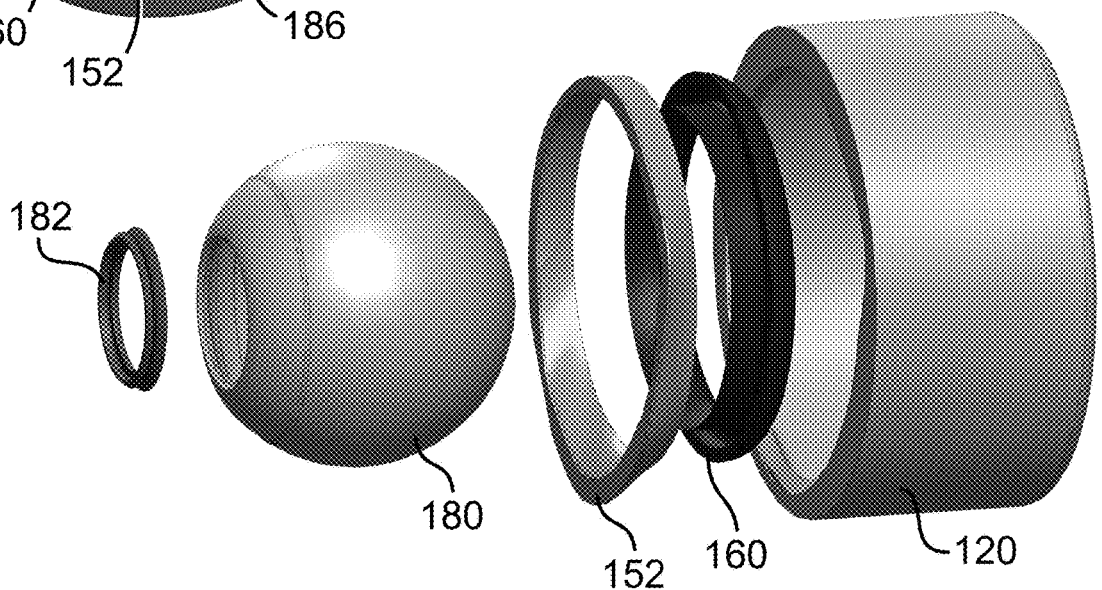
FIG. 2
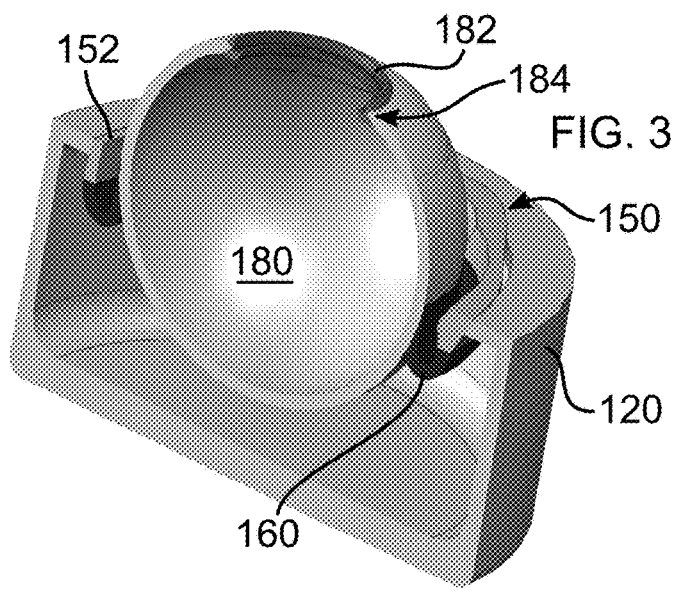
FIG. 3
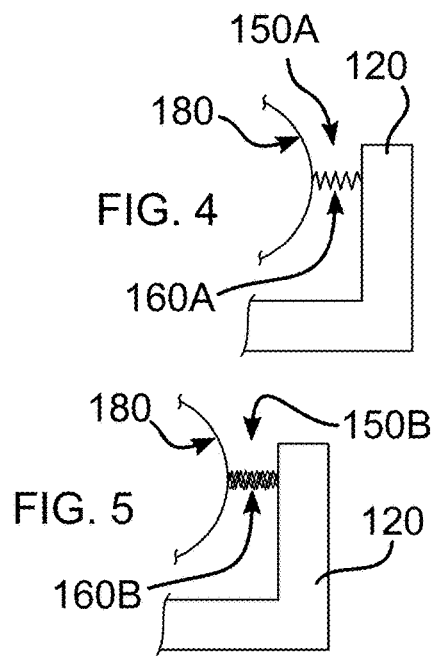
FIG. 4
FIG. 5

SUSPENDING THE EYE IN A MODEL FOR SURGICAL SIMULATION

FIELD OF THE DISCLOSURE

This disclosure relates to simulating eye surgery, and more particularly to artificially reproducing the feel and degree of freedom of the natural suspension of the eye.

BACKGROUND OF THE DISCLOSURE

Many surgical techniques require dexterous movement and control by the surgeon. This dexterity cannot be adequately developed by reading textbooks or watching instructional videos. Animal models or cadavers have been the default method for hands-on surgical training. Today, simple models of the eye and head are available for study or practice.

The eye has the ability to roll in every direction, provided via a joint formed between the eyeball and the orbit and its surrounding flesh and fat. Eye movement is chiefly induced by four posterior rectus muscles, although oblique muscles additional play an important role. The muscles move the eyeball within the fleshy/bony socket formed by the orbit.

To reduce movement of the eye during surgery, surgeons must apply counterpressure during their maneuvers, or in some cases traction sutures may be placed to immobilize the eye as a first step in procedures such as a trabeculectomy.

SUMMARY OF THE DISCLOSURE

In an embodiment of the disclosure, a device for simulating surgery upon a natural eyeball, comprises an eyeball corresponding to the natural eyeball simulated; a frame peripherally surrounding the eyeball; and a suspension connected to the eyeball and the frame to extend between the eyeball and the frame, having a flexible annular peripheral coupling connected to the eyeball and the frame to be flexed when an external force is applied to the eyeball to enable the eyeball to be moved within a range of motion corresponding to the range of motion of the natural eye that is simulated, the peripheral coupling flexing when the force is applied to the eyeball with a predetermined resistance to thereby cause the eyeball to displace with a force corresponding to a resistance to movement of the natural eye.

In variations thereof, the suspension is releasably connectable to the frame; the suspension further includes a support band connected to the frame and the peripheral coupling to extend between the frame and the peripheral coupling to thereby connect the annular peripheral coupling to the frame, the support band more resistant to flexing than a material forming the peripheral coupling; the support band is releasably connectable to the frame; the support band is threadably fastenable to the frame; and/or the support band is permanently affixed to the peripheral coupling.

In other variations thereof, the frame has a shape corresponding to the shape of the orbit of a natural eye, at least a portion of the eyeball suspended by the suspension within the orbit; the peripheral coupling has a U-shaped cross-section; the peripheral coupling forms undulations; the eyeball includes structures corresponding to the iris, lens, and sclera; the eyeball is separable into anterior and posterior components; the eyeball contains a fluid corresponding to vitreous fluid; the peripheral coupling is formed by a plurality of springs; the peripheral coupling is formed of a resilient elastomeric material; wherein the elastomeric material includes annular folds or wave shaped rings; and/or the peripheral coupling is formed of a woven material.

In still further variations thereof, the peripheral coupling extends between an open end of the frame and a midpoint of the eyeball; the frame is shaped to correspond to bones of the face, and particularly includes depressions near areas corresponding to the bridge of the nose and the side of the face; and/or the frame includes shapes corresponding to bones of the face, including the area of the maxilla and zygomatic bones, the orbit, nasal opening, and the coronal suture of the skull.

In another embodiment of the disclosure, a device for simulating surgery upon a natural eyeball, comprises an eyeball corresponding to the natural eyeball being simulated; a frame peripherally surrounding the eyeball and including shapes corresponding to bones of the face; a suspension including: a peripheral coupling annularly surrounding the eyeball, connected to the eyeball and extending towards the frame, and formed of a material that can be flexed side to side and upwards and downwards to enable the connected eyeball to be movable in three dimensions when an external force is applied to the eyeball; and a support band annularly surrounding the peripheral coupling, connected at a first end to the peripheral coupling, and at a second end to the frame to, to thereby connect the peripheral coupling to the frame, and the support band releasably connectable to the frame; whereby when the external force is applied to the eyeball, the eyeball has a range of motion limited by the suspension corresponding to a range of motion of the natural eye being simulated, and a resistance to displacement imposed by the suspension corresponding to a resistance to movement of the natural eye being simulated.

BRIEF DESCRIPTION OF THE DRAWINGS

A more complete understanding of the disclosure, and the attendant advantages and features thereof, will be more readily understood by reference to the following detailed description when considered in conjunction with the accompanying drawings, in which:

FIG. 1 depicts a perspective view of an eye model of the disclosure including a suspension for the eyeball;

FIG. 2 depicts an exploded view of the eye model of FIG. 1;

FIG. 3 depicts a cross-section of the eye model of FIG. 1 taken through a center of the eye model;

FIG. 4 depicts a diagrammatic cross-section through an eye model of the disclosure showing a suspension formed as a series of folds or undulations;

FIG. 5 depicts a diagrammatic cross-section through an eye model of the disclosure showing a suspension formed with a woven material;

DETAILED DESCRIPTION OF THE DISCLOSURE

Figure 6:
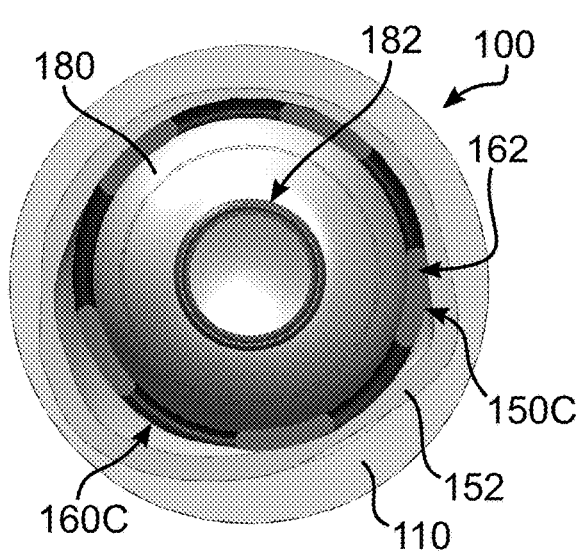
FIG. 6 depicts a front view of the eye model of FIG. 1, with the peripheral coupling formed as a series of segments.
Figure 7:
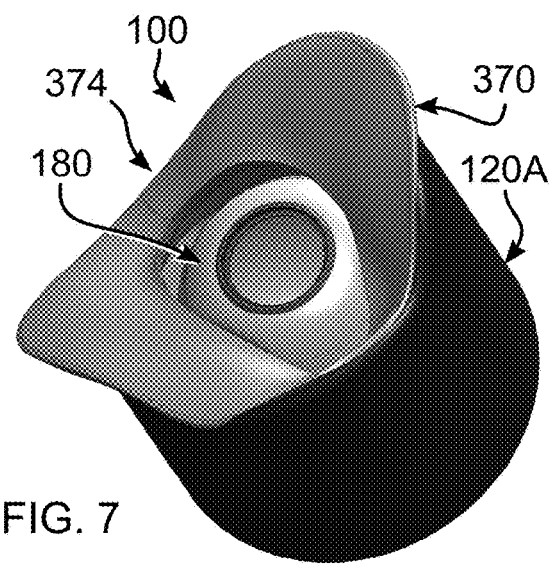
FIG. 7 depicts the eye model of FIG. 1, with an alternative frame and a skin layer, each representing anatomical features of the face in the area of the eye.
Figure 8:
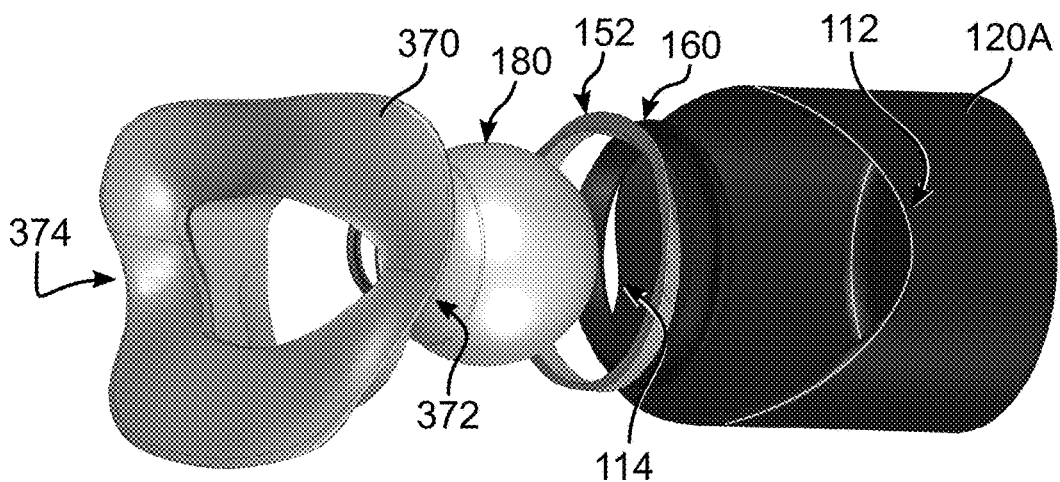
FIG. 8 is an exploded view of the eye model of FIG. 7.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Headings are provided for the convenience of the reader, and are not intended to be limiting in any way.

The inventor has observed that the eye, by virtue of the aforedescribed ball and socket joint formed between the eyeball and orbit, appears to have the attribute of being padded, whereby the eyeball seems "free floating" within certain constraints. The eye can be pushed, pulled, translated, and rotated in any direction with the application of modest external forces. Thus, particularly in the context of ophthalmic surgery, as the surgeon applies force to the eye, unwanted or unexpected movements of the eye add complexity to the procedure.

Accordingly, to foster further skill in eye surgery, the disclosure provides for reproducing this natural movement of the eye within a surgical model for simulating eye surgery. The disclosure thus better prepares surgeons for anticipating natural eye movement in an anticipated surgical methodology, and can additionally thereby decrease the likelihood of a requirement for traction sutures, reducing further trauma to the eye.

With reference to FIGS. 1-3, a surgical model 100 includes a frame 120, a suspension 150, and a model of an eyeball 180. An example of an eyeball 180 that can be used within the instant disclosure can be found in my U.S. Pat. No. 10,360,815 or 10,636,325, although a greater or fewer number of particular features of the eyeball therein can be included, as best meets the needs of the surgical procedure being studied and practiced with the instant disclosure. The eyeball 180 and frame 120 can further include one or more features as disclosed in my U.S. Patent Publication 2020/

0118466. The contents of each of the foregoing patents and publications is hereby incorporated by reference herein. Example features which can be included in the eyeball of the disclosure include structures corresponding to the iris, lens, and sclera; the eyeball is separable into anterior and posterior components; and the eyeball contains a fluid corresponding to vitreous fluid. Further, the eyeball can include imaging of the interior of the eye, including for example the retina and fundus. Further, the eyeball can be formed from a soft material that can be pierced by a needle and other tools with a resistance that corresponds to that found in the natural eye. Additional examples can be found in the incorporated references.

Eyeball 180 can be fabricated from any of the materials disclosed in the incorporated references, which can include for example a polymeric material, a natural material, or a composite material. For the simulation of certain surgical procedures, eyeball 180 can be fabricated using a material that pierces with the same surgical tools as may be used in the surgery simulated, with the same resistance to puncture and frictional force. Eyeball 180 can further be filled with a substance having a similar viscosity and/or color to vitreous fluid, and may be divided into posterior and anterior cavities as in the human eye.

In the embodiment shown, eyeball 180 includes a connector 182 for removably attaching a lens, iris, or other central structure (not shown). Alternatively, such other eye structures can be directly attached to a remainder of eyeball 180. In the embodiment shown, connector 182 forms a mating dovetail connection 184 with eyeball 180. The connection may be formed by providing either or both of eyeball 180 and connector 182 as flexible and deformable parts, or either or both of eyeball 180 and connector 182 can be formed as separate attachable parts. Peripheral line 186 can be a seam along which eyeball 180 is divided into two partial spheres. Connector 182 can be permanently affixed, such as by adhesive, or can be removable, for example to enable cleaning or the replacement of parts.

Frame 120 can have any of a variety of shapes, as discussed further elsewhere herein. In the embodiment of FIGS. 1-3, frame 120 has a basic design, with the objective of supporting the suspension 150 and eyeball 180 during use. More particularly, frame 120 completely encircles suspension 150 and eyeball 180, while a portion of eyeball 180 projects beyond the enclosure created by frame 120. Frame 120 can be fabricated from any suitably durable material, such as a polymer, a natural material, a composite, or a metal alloy or metal coated material, as examples.

In an embodiment, suspension 150 includes a support band 152 which contacts and connects to frame 120, and a resilient annular peripheral coupling 160 contacts and connects to eyeball 180. In the embodiment shown, support band 152 and peripheral coupling 160 are formed as separate parts which interconnect, although in another embodiment, peripheral coupling 160 replaces and includes the functionality of the peripheral coupling 152, connecting directly between eyeball 180 and frame 120. As shown, peripheral coupling 160 forms a bellows type structure forming a single wave, although coupling 160 can form a plurality of waves or undulations, each of which distributes flex along a width of the wave. The length and geometry of the cross section of coupling 160 can be modified to enable fine tuning of the range of movement in each of the 6 degrees of freedom described herein, as well as the resistance to such movements to the application of external force, as desired. As non-limiting examples, coupling 160 can be made longer or shorter, or there may be greater or fewer waves patterns, or the wave patterns may be thinner or thicker, or varied in thickness.

In an embodiment, the peripheral coupling extends between an open end of the frame to a point close to the midpoint of the eyeball, as illustrated, to most closely reflect natural anatomy and/or to produce the natural anatomical behavior. However, the peripheral coupling can attach to other locations on the eyeball, and the peripheral coupling or support band 152 can attach to other locations on frame 110/120/376, as best meets the needs of the surgery to simulate.

An advantage of using a separate support band 152 and peripheral coupling 160 as two distinct parts collectively forming the suspension 150, as illustrated, is that the parts 152, 160 can be formed of different materials. In particular, support band 152 can be rigid or semi-rigid, enabling threads to be formed upon an exterior surface (not shown), which threads can be mated with threads on an inner surface (not shown) of frame 120. Alternatively, a snap-fit or other interference type union can be formed between support band 152 and frame 120, or a twist-locking fitting, or support band 152 can be adhered or otherwise bonded to frame 120, either permanently or temporarily. An example of a temporary attachment could be a gel-type adhesive, and a permanent attachment could be ultrasonic welding, as examples.

Likewise, peripheral coupling 160 can be formed of a relatively soft, highly pliable and flexible material relative to support band 152. In this manner, peripheral coupling 160 can be permanently bonded or otherwise removably or non-removably attached to support band 152 and eyeball 180, while the assembly of 152/160 can be rigidly affixed to frame 120, while remaining removably installed into frame 120, for example for cleaning, repair, or replacement. A permanent bond between peripheral coupling 160 and support band 152 can be formed using an adhesive, ultrasonic welding, or co-molding, as examples. Alternatively, support band 152 can be releasably attached to peripheral coupling 160, for example using an adhesive that can be separated without tearing peripheral coupling 160. Other means of support band 152 and peripheral couplings 160 can include fasteners, clips interference fit, snap fit, and dovetail joints, as further examples.

In an embodiment, peripheral coupling 160 can be attached to eyeball 180 by forming a resilient interference fit with eyeball 180, which can be further strengthened with adhesive.

As noted previously, in a further embodiment, peripheral coupling 160 and support band 152 can be formed as a unitary part, where a thickness of the part tapers from as peripheral coupling portion 160 extends from the frame to the eyeball, or vice versa, or the entire width of peripheral coupling portion 160 is a uniform thickness and material along its width is sufficiently pliable and flexible to enable sufficient movement of eyeball 180 relative to frame 120, as described herein.

Referring now to FIG. 4, suspension 150A is diagrammatically illustrated in cross-section, illustrating that support band 152 and peripheral coupling 160A can be formed with an undulated or z-shaped cross-sectional profile, providing additional area over which flexure can take place. This enables a wider variety of choice of materials, as additional folds can enable (1) a more rigid and durable material to be used, while maintaining a desired overall flexibility, the material and number of folds selected to simulate the natural resistance to movement of the eye which is modeled, and (2) a range of motion of the natural eye (represented as eyeball 180) within the socket (represented as frame 120), with the goal of simulating the full natural motion of the eye when a force is applied to a surface of the eye.

In FIG. 5, a suspension 150B includes coupling 160B in the form of a mesh, illustrating that other fabrics and materials which are flexible, such as a woven material, can be used for support band 152 and/or peripheral coupling 160B, which can be selected to be flexible and stretchable to mimic a resistance to movement and a range of motion of the eye that is modeled.

In FIG. 6, suspension 150C is shown with a series of gaps 162 (dark grey), which forms peripheral coupling 160C as separated segments which can have a variable length, thereby providing a further configurable desired resistance to movement, for example while using a more rigid and durable material for support band 152 and/or peripheral coupling 160, while enabling sufficient flexibility and stretchability to thereby reflect the natural resistance to movement and a range of motion of the eye that is being modeled. Similar gaps (not shown) can be formed in support band 152 to likewise enable a stiffer material to provide the same range of flexibility of a unitary form. In an embodiment, peripheral coupling segments 160C (or support band segments) can each have the form of a helical spring (not shown) spanning between eyeball 180 and support band, or spanning between peripheral coupling 160 and frame 120/120A (or extension 376 within mask 200, described below). Other types of mechanical spring types can be used, including for example linear elastomeric strips, for example.

As such, the peripheral coupling 160/160A-C is shaped as described herein and is formed of a material that can be flexed side to side and upwards and downwards to enable the connected eyeball to be movable in some or all of the six degrees of freedom corresponding to: roll left-right (looking side to side) [e.g. yaw in an aviation context], roll up-down (looking up or down) [pitch], and roll angularly [roll], superior/inferior translation, medial/lateral translation, and anterior/posterior translation. Certain of these movement naturally occur, while others occur chiefly only by the application of an external force to the eyeball, such as during surgical manipulation.

Support band 152 and/or peripheral coupling 160 can be fabricated from a polymeric material, a natural material, a composite material, a metal or metal containing composite or alloy, or a woven material or fabric, any of which may be coated or otherwise treated for corrosion resistance or other durability factor, and/or to modify a mechanical characteristic of the material. Examples include moldable elastomers or a combination of elastomers, such as a latex or acrylic elastomer or other polymer. Band 152 and other flexible couplings and components of the disclosure can be fabricated using molding or 3D printing, for example.

Referring now to FIGS. 7-10, frame 120A is shaped to more closely simulate a portion of the shape of bone and/or cartilage near the orbit. Likewise, a surface layer 370 is provided which likewise simulates a portion of the skin, eyelids, and underlying tissues which surround the eye according to the nature of the eye model. For example, frame 120A can be shaped to correspond to bones of the face, and particularly to include depressions near areas corresponding to the bridge of the nose and the side of the face. As can be seen in the figures, a curved and deep recessed portion 112 reproduces a corresponding curve adjacent the eye towards the ear, and a curved shallow recessed portion 114 reproduces a corresponding curve near a laterally opposite side of the eye towards the nose.

Figure 9:
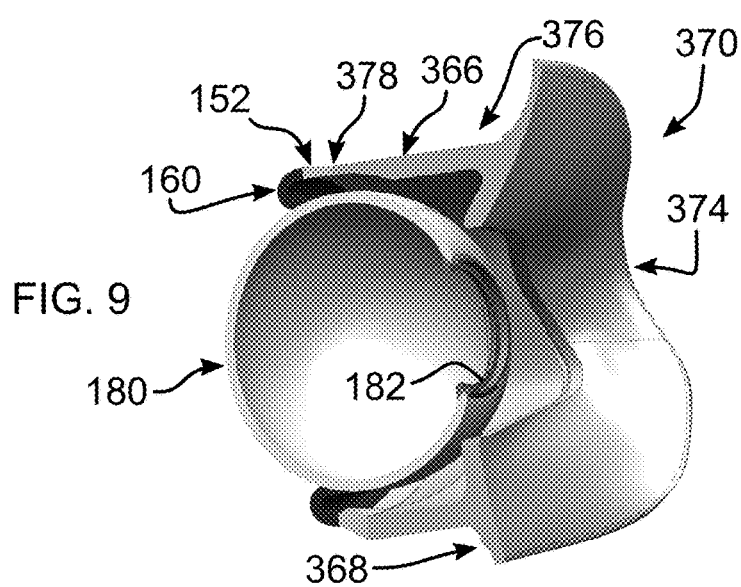
FIG. 9 is a cross-section through a center of the eye model of FIG. 7, with the frame not included.
Figure 10:
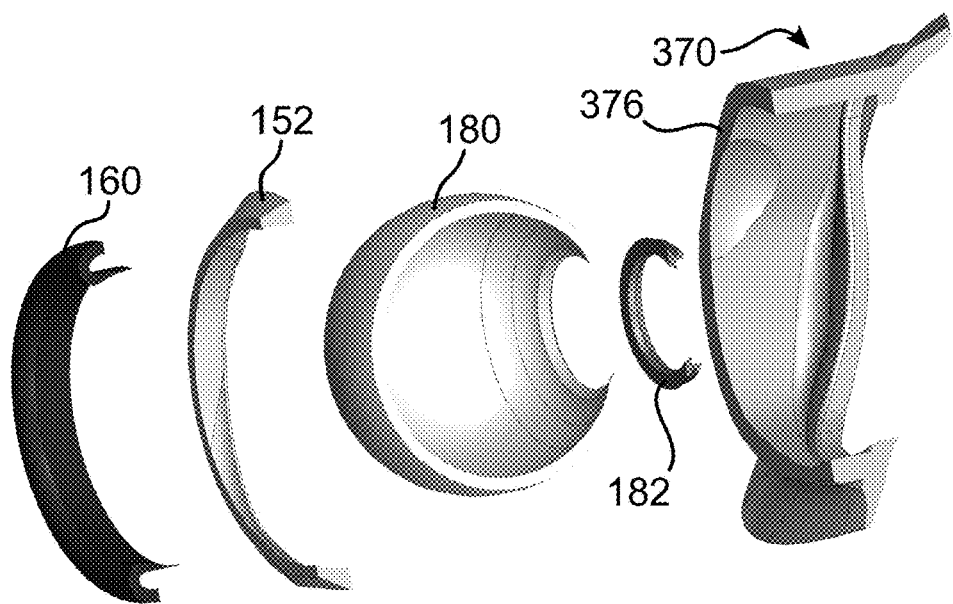
FIG. 10 is a an exploded cross-section through a center of the eye model of FIG. 7, with the frame not included.

Surface layer 370 is positioned anterior to the orbit surrounding the eyeball 180, as it is in the body, and includes recessed portions 372, 374 which cover and are curved correspondingly to the deep and shallow recessed portions 112, 114 of frame 120A, respectively. With reference to FIG. 9, it may be seen that surface layer 370 includes a mounting extension 376 extending posteriorly from the skin/surface simulating surface, to peripherally surround a portion of the eyeball 180. In the embodiment of FIG. 9, it may be seen that support band 152 is affixed to a distal end 378 of mounting extension 376, instead of an interior perimeter of frame 120 as in FIGS. 1-6. As such, surface layer 370 is affixed to frame 120A, at an exterior face 366 of mounting extension 376 and/or along an underside 368 of surface layer 370. In an embodiment, extension 376 has sufficient flexibility to contribute an extent of movement to eyeball during simulation of surgery.

Attachment between (a) distal end 378 and support band, (b) exterior face of extension 376 and a surface of frame 120A, and/or (c) underside 368 of surface layer 370 and a surface of frame 120A can each be carried out by any of adhesive, ultrasonic or other vibratory bonding, mechanical bonding such as a snap fit, clip, clamp, dovetail connection or interference fit, all as non-limiting examples.

Figure 11:
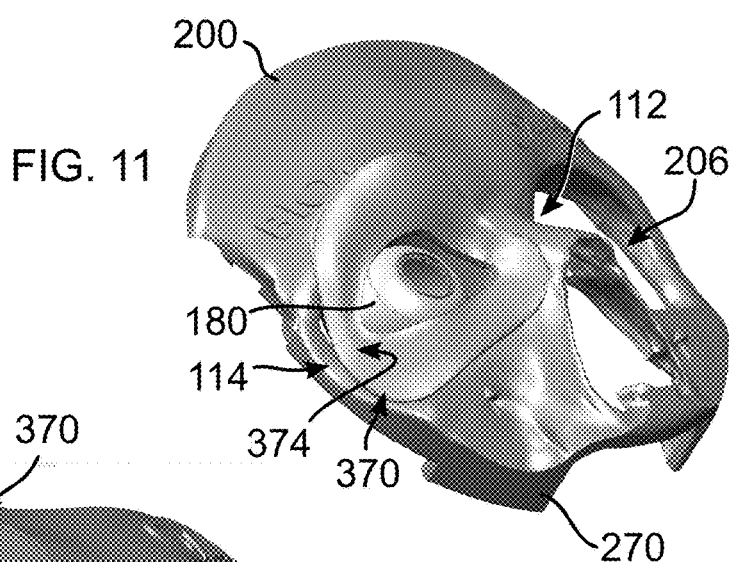
FIG. 11 is a perspective view of the eye model of FIG. 9 inserted in an anatomically correct location within a mask depicting an upper portion of bones of the face.
Figure 12:
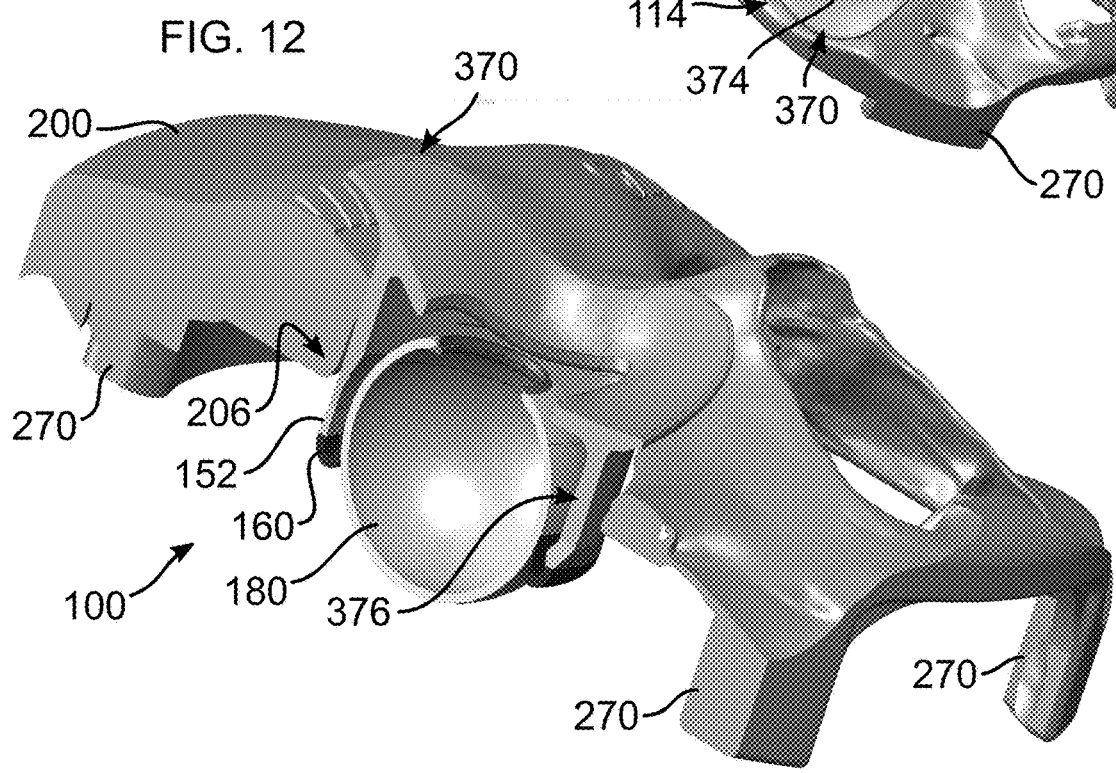
FIG. 12 is a cross section through the eye model of FIG. 11, taken through a center of the eye.

Referring now to FIGS. 11-12, device 100 includes, the "mask" or skull face portion of my U.S. Pat. No. 11,127,314, designated reference 200 in the patent and herein, and which provides the features of frame 120/120A. There are additionally numerous features and benefits of mask 200 described in the patent, including training for working and hand positioning in the proximity of other body structures of the face, while eliminating other portions of the head which are not relevant to surgical modeling for procedures to be carried out upon the eye. Other beneficial structures described in the patent, such as nose structure 240 and base 110 of the patent, for example, can be used with equal purpose and benefit in combination with the instant disclosure.

A distinction, however, is that a separate support structure, such as the base insertion area 150 (of the patent), for holding the eye portion of the model, is not needed. Instead, eyeball 180 is supported by suspension 150 and mounting extension 376 as described with respect to FIGS. 7-10. In turn, surface layer 370 is supported by a surface surrounding orbit 206 of mask 200, and mounting extension 376 is inserted into an opening formed by orbit 206. In this manner, surface layer 370 simulates not only a skin surface as provided elsewhere herein, but also supports and correctly orients eyeball 180 with respect to bones of the face.

As detailed in the incorporated patent, mask 200 includes, for example, areas corresponding to bones of the face, including the area of the maxilla and zygomatic bones, the orbit, nasal opening, and the coronal suture of the skull, while other portions of the skull can also be included.

As such, an assembly of surface layer 370, mounting extension 376, and eyeball 180 can be held into position within the orbit by gravity, with surface extension contacting mask 200 about the orbit to correctly position and maintain the assembly within mask 200. In addition, other fastening methods can be used as needed to secure the assembly within and upon mask 200, the fastening preferably but not necessarily disposed along a surface below mask 200, including hook and loop fastener, adhesive, interference fit, tongue and groove, clip, resilient snap fit, twist lock, screw, or other fastener. Surface layer 370 can be provided as sufficiently flexible to enable, once assembled anteriorly onto mask 200, to be of sufficiently pliably to conform to a surface of mask 200, as occurs in the body. One or both of orbits 206 can be provided with an eye assembly as described. As a surgeon may be left or right handed, practice for each eye will be different, and beneficial.

Mask 200 can be used with or without the base 110 of the patent, and can for example be supported upon a surface by posts 270, which are sized to prevent a suspended eyeball 180 from contacting a supporting surface, such as a table. In an embodiment, posts 270 are provided with a threaded foot (not shown), analogous to set screw 170 of the patent, which can be adjusted to ensure mask 200 rests upon a supporting surface in a stable fashion. Alternatively, if a base 110 of the patent is to be used together with mask 200, for example to support drainage collection as described in the patent, the base 110 can be provided with the set screws 170 as described in the patent.

As such, the disclosure describes simulating several or all dimensions of motion of the eye as may occur during surgery, and particularly, allowing the motion of the inner sphere of the eyeball in, for example three or six degrees of freedom, in a manner akin to a natural eye in its socket, which responds to external forces such as those produced by manipulation of the eye with surgical instruments, allowing rotation around x, y and z axes, and also linear movements along X, Y and Z planes.

The disclosure provides further options for ophthalmic surgical simulation by simulating the natural motion response of the human eye, to external forces. The padded ball-and-socket natural joint of the eye is represented and mimicked by a flexible annular connection between the eyeball 180 and surrounding orbit 206 (frame 120/120A/ mask 200), allowing a varying degree of range and resistance of motion depending on the particular materials chosen and structure selected for suspension 150, as described herein.

All references cited herein are expressly incorporated by reference in their entirety. There are many different features of the present disclosure and it is contemplated that these features may be used together or separately. Unless mention was made above to the contrary, it should be noted that all of the accompanying drawings are not to scale. Thus, the disclosure should not be limited to any particular combination of features or to a particular application of the disclosure. Further, it should be understood that variations and modifications within scope of the disclosure might occur to those skilled in the art to which the disclosure pertains. Accordingly, all expedient modifications readily attainable by one versed in the art from the disclosure set forth herein that are within the scope of the present disclosure are to be included as further embodiments of the present disclosure.

List of Reference Numerals:

100 model
110 frame
120/120A frame
112 frame deep recessed portion
114 frame shallow recessed portion
150/150A-C suspension
152 suspension support band
160/160A-C frame peripheral coupling
162 peripheral coupling gaps
180 eyeball
182 eye connector
184 eye dovetail connection
186 eye peripheral line
200 mask/face portion -continued List of Reference Numerals:

206 mask orbit
270 mask post
366 extension exterior face
368 surface layer underside
370 surface layer
372 surface layer recessed portion
374 surface layer recessed portion
376 mounting extension
378 mounting extension distal end

What is claimed is:

1. A device for simulating surgery upon a natural eyeball, comprising:
    an eyeball corresponding to the natural eyeball simulated;
    a frame peripherally surrounding the eyeball; and
    a suspension
        connected to the eyeball and the frame to extend between the eyeball and the frame,
        having a flexible annular peripheral coupling connected to the eyeball and the frame to be flexed when an external force is applied to the eyeball to enable the eyeball to be moved within a range of motion corresponding to the range of motion of the natural eye that is simulated,
        the peripheral coupling flexing when the force is applied to the eyeball, the peripheral coupling opposing the applied force with a predetermined resistance to thereby cause the eyeball to resist displacement with a force corresponding to a resistance to displacement of the natural eye.

2. The device of claim 1, the suspension releasably connectable to the frame.

3. The device of claim 1, the suspension further including a support band connected to the frame and the peripheral coupling to extend between the frame and the peripheral coupling to thereby connect the annular peripheral coupling to the frame, the support band more resistant to flexing than a material forming the peripheral coupling.

4. The device of claim 3, the support band being releasably connectable to the frame.

5. The device of claim 4, the support band threadably fastenable to the frame.

6. The device of claim 4, the support band permanently affixed to the peripheral coupling.

7. The device of claim 1, the frame having a shape corresponding to the shape of the orbit of a natural eye, at least a portion of the eyeball suspended by the suspension within the orbit.

8. The device of claim 1, wherein the peripheral coupling has a U-shape cross-section.

9. The device of claim 1, wherein the peripheral coupling forms undulations.

10. The device of claim 1, wherein the eyeball includes structures corresponding to the iris, lens, and sclera.

11. The device of claim 1, wherein the eyeball is separable into anterior and posterior components.

12. The device of claim 1, wherein the eyeball contains a fluid corresponding to vitreous fluid.

13. The device of claim 1, wherein the peripheral coupling is formed by a plurality of springs.

14. The device of claim 1, wherein the peripheral coupling is formed of a resilient elastomeric material.

15. The device of claim 14, wherein the elastomeric material includes annular folds or wave shaped rings.

16. The device of claim 1, wherein the peripheral coupling is formed of a woven material.

17. The device of claim 1, wherein the peripheral coupling extends between an open end of the frame and a midpoint of the eyeball.

18. The device of claim 1, wherein the frame is shaped to correspond to bones of the face, and particularly includes depressions near areas corresponding to the bridge of the nose and the side of the face.

19. The device of claim 1, wherein the frame includes shapes corresponding to bones of the face, including the area of the maxilla and zygomatic bones, the orbit, nasal opening, and the coronal suture of the skull.

20. A device for simulating surgery upon a natural eyeball, comprising:
- an eyeball corresponding to the natural eyeball being simulated;
- a frame peripherally surrounding the eyeball and including shapes corresponding to bones of the face; and
- a suspension including:
  - a peripheral coupling
    - annularly surrounding the eyeball,
    - connected to the eyeball and extending towards the frame, and
    - formed of a material that can be flexed side to side and upwards and downwards to enable the connected eyeball to be movable in three dimensions when an external force is applied to the eyeball; and
  - a support band
    - annularly surrounding the peripheral coupling,
    - connected at a first end to the peripheral coupling, and at a second end to the frame to, to thereby connect the peripheral coupling to the frame, and
    - the support band releasably connectable to the frame;
- whereby when the external force is applied to the eyeball, the eyeball has a range of motion limited by the suspension corresponding to a range of motion of the natural eye being simulated, and a resistance to displacement imposed by the suspension corresponding to a resistance to movement of the natural eye being simulated.

* * * * *